(12) United States Patent
Bubeck et al.

(10) Patent No.: US 10,197,116 B2
(45) Date of Patent: Feb. 5, 2019

(54) METHOD FOR THE CONTROL OF THE SLIP OF A CLUTCH DEVICE OF A GEARBOX

(71) Applicant: Dr. Ing. h.c. F. Porsche Aktiengesellschaft, Stuttgart (DE)

(72) Inventors: Jan Bubeck, Stuttgart (DE); Heiko Gross, Leinfelden-Echterdingen (DE); Steffen Winterhalder, Ditzingen (DE); Christoph Fischer, Stuttgart (DE); Viktor Stoimenov, Villingen-Schwenningen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/680,231

(22) Filed: Aug. 18, 2017

(65) Prior Publication Data

US 2018/0058519 A1 Mar. 1, 2018

(30) Foreign Application Priority Data

Aug. 24, 2016 (DE) .................. 10 2016 115 672

(51) Int. Cl.
  *F16H 61/14* (2006.01)
  *F16D 48/06* (2006.01)
(52) U.S. Cl.
  CPC ............ *F16D 48/06* (2013.01); *F16H 61/14* (2013.01); *F16D 2500/10412* (2013.01); *F16D 2500/30806* (2013.01); *F16D 2500/30816* (2013.01); *F16D 2500/30818* (2013.01); *F16D 2500/30825* (2013.01); *F16D 2500/70426* (2013.01)

(58) Field of Classification Search
  None
  See application file for complete search history.

(56) References Cited

U.S. PATENT DOCUMENTS

| | | | |
|---|---|---|---|
| 4,724,939 A | 2/1988 | Lockhart et al. | |
| 6,113,515 A | 9/2000 | Salecker et al. | |
| 7,286,922 B1* | 10/2007 | Fischer | F16H 61/143 192/54.1 |
| 9,670,972 B2* | 6/2017 | Smith | F16D 48/06 |
| 2002/0111244 A1* | 8/2002 | Miyata | F16H 37/086 475/214 |
| 2010/0018828 A1 | 1/2010 | Maerkl et al. | |
| 2016/0068163 A1* | 3/2016 | Fujii | B60W 30/19 701/54 |

FOREIGN PATENT DOCUMENTS

| | | |
|---|---|---|
| DE | 19818809 A1 | 12/1998 |
| DE | 102008032757 A1 | 1/2010 |

* cited by examiner

*Primary Examiner* — Justin Holmes
(74) *Attorney, Agent, or Firm* — Leydig, Voit & Mayer, Ltd.

(57) ABSTRACT

A method for controlling a slip of a clutch device of a gearbox of a vehicle includes measuring at least one rotational speed value on a gearbox shaft of the gearbox; determining an active gearbox shaft; determining the angular acceleration on the active gearbox shaft determined, on the basis of the at least one measured rotational speed value; producing a rattling characteristic value on the basis of the angular acceleration determined over at least one time interval; and controlling the slip of the clutch device on the basis of a comparison of the rattling characteristic value produced with at least one rattling threshold value.

10 Claims, 3 Drawing Sheets

METHOD FOR THE CONTROL OF THE SLIP OF A CLUTCH DEVICE OF A GEARBOX

CROSS REFERENCE TO RELATED APPLICATIONS

This application claims benefit to German Patent Application No. DE 10 2016 115 672.8, filed Aug. 24, 2016, the entire disclosure of which is hereby incorporated by reference herein.

FIELD

The present invention relates to a method for the control of the slip of a clutch device of a gearbox and to a corresponding control device.

BACKGROUND

It is known that gearboxes which have a plurality of different gears are used in vehicles. In order to be able to change between different gears, a clutch device is necessary, which decouples an input shaft of the gearbox from the output shaft of the gearbox for the gear change. For this purpose, clutch disks are separated and therefore the transmission of torque via the gearbox is suppressed for the time period of the gear change. The operation of the clutch can be carried out in so-called slip situations. Slip of a clutch is defined by the fact that a primary side and a secondary side of the clutch can have a corresponding speed relative to each other. The greater the slip between the primary side and the secondary side, the greater this relative speed is. If the slip is smaller or even equal to zero, then the primary side and the secondary side move with the same rotational speed. One example for the control of the slip in clutches is given in DE 10 2008 032757 A1. There, too, in principle the object of the control with the reduction of gearbox noise is indicated.

In the known solutions, it is disadvantageous that the control of the slip in clutch devices has previously been possible only on the basis of characteristic maps. Such characteristic maps take the current driving situation of the vehicle into account and in this way, for example determined by test bench trials, can provide control of the slip for the respective driving situation. Depending on the driving situation, however, as a result of the influence of a large number of further characteristic values, the slip conditions cannot always be described unambiguously via a characteristic map. This can lead to the situation in which, in particular as a result of wear on components of the vehicle and as a result of component tolerances, rattling noises can occur in the gearbox when the predefined slip is too low. Such influencing characteristic values, which vary over time, can only be avoided by the pre-definition of characteristic maps by rattling noises being depicted in the characteristic map by a corresponding safety margin. However, this inevitably leads to increased fuel consumption and to increased emissions (e.g. $CO_2$) from the vehicle over its period of use.

SUMMARY

In an embodiment, the present invention provides a method for controlling a slip of a clutch device of a gearbox of a vehicle. The method includes measuring at least one rotational speed value on a gearbox shaft of the gearbox; determining an active gearbox shaft; determining the angular acceleration on the active gearbox shaft on the basis of the at least one measured rotational speed value; producing a rattling characteristic value on the basis of the angular acceleration determined over at least one time interval; and controlling the slip of the clutch device on the basis of a comparison of the rattling characteristic value produced with at least one rattling threshold value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
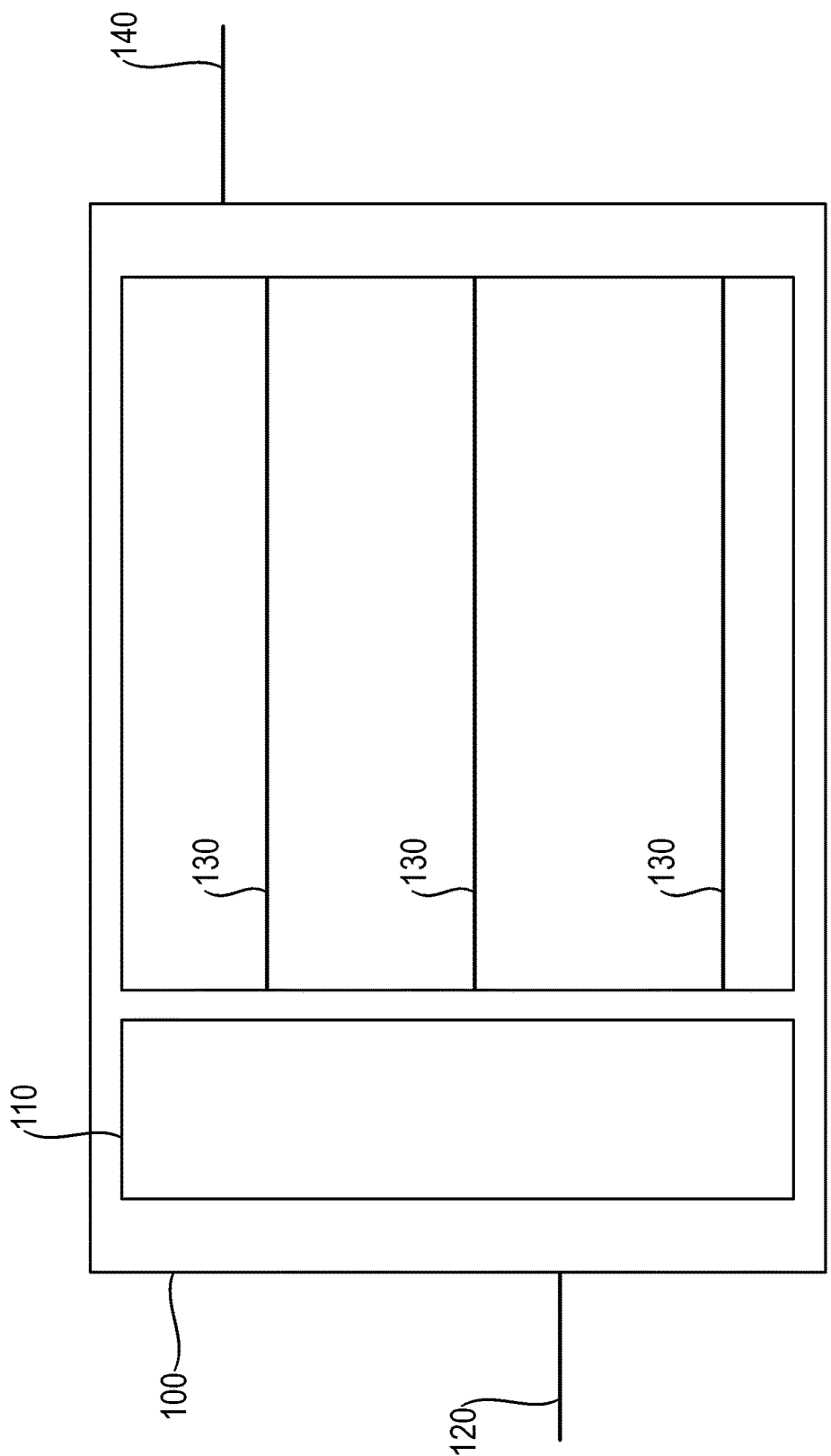
FIG. 1 shows a schematic illustration of a gearbox.

As described herein, embodiments of the present invention can permit the control of the slip in an economical and simple way, at the same time to increase the convenience and to keep the consumption the same or even likewise to minimize said consumption.

According to an embodiment of the invention, a method for controlling a clutch device of a gearbox of a vehicle is provided. The control method has the following steps: measuring at least one rotational speed value on a gearbox shaft of the gearbox, determining an active gearbox shaft, determining the angular acceleration on the active gearbox shaft determined on the basis of the at least one measured rotational speed value, producing a rattling characteristic value on the basis of the angular acceleration determined over at least one time interval, and controlling the slip of the clutch device on the basis of a comparison of the rattling characteristic value produced with at least one rattling threshold value.

The method according to an embodiment of the invention therefore replaces the characteristic maps used previously during the regulation or the control of the slip. During a performance of the method according to the invention, instead of characteristic maps, actual and real feedback with the current operating situation is possible. In particular, use can be made of sensors which are already located on the vehicle or on the gearbox. Rotational speed sensors for input shaft and/or output shaft of a gearbox and for individual shafts within the gearbox are usually already provided, at least in some sections. The detection of corresponding sensor values permits at least one rotational speed value to be measured on an input shaft of the gearbox for a method according to the invention. Therefore, the method according to the invention can be triggered and, on the basis of said rotational speed value, further performance of the steps can be carried out. In addition to the determination of the rotational speed value, the determination of further signals, for example of structure-borne sound in components of the vehicle, can also be carried out. The definition of the time interval for the production of the rattling characteristic value can preferably be definable as a function of rotational speed.

In a second step, the active gearbox shaft is determined. In a gearbox, at least two different transmission ratios are usually possible, which are also designated as different gears. Modern gearboxes in vehicles are frequently equipped with a large number of at least five, frequently even six, seven or eight, different transmission ratios and correspondingly different gears. The determination of the active gearbox shaft can be carried out, for example, via additional sensors, which detect the corresponding gear selection or the set gear on the vehicle or on the gearbox. On the basis of the constructionally designed transmission ratio within the gearbox for this active gearbox shaft, the corresponding rotational speed and therefore also the angular acceleration on the active gearbox shaft can then likewise be determined on the basis of the rotational speed value on the input shaft of the gearbox. This determination of the angular acceleration also then permits a statement to be made as to which angular acceleration is present, given the respective transmission ratio on the respective active gearbox shaft in the interior of the gearbox. The angular acceleration is a critical influencing variable for corresponding rattling noises within the gearbox. Accordingly, this angular acceleration is then used over a time interval in a control unit to produce a rattling characteristic value. One possible way of producing a rattling characteristic value is if the angular acceleration is integrated over this at least one time interval. In other words, this means that, given an increased rattling characteristic value, the angular acceleration in this time interval has a high sum and accordingly a high integral result. As opposed to this, given a low angular acceleration, a small value for the rattling characteristic value is produced in an integrated way over the time interval.

An idea that is important to embodiments of the invention is accordingly to transfer a correlation of physically detectable or determinable parameters into a common and simple characteristic value in the form of the rattling characteristic value. This rattling characteristic value can then finally be supplied to the control of the slip in a very simple control step, which can therefore be carried out quickly and economically. Here, according to the invention, it should be pointed out that control can be understood to mean both closed-loop control and open-loop control of the slip. However, since here a very important part in the control of a vehicle is concerned, a closed-loop control system is preferably provided for a control method according to the invention.

In the last step of the method, the control of the slip of the clutch device is carried out, that is to say the feedback and therefore the influence by a method according to the invention. This control is carried out on the basis of a comparison of the rattling characteristic value described and produced with at least one rattling threshold value. This rattling threshold value can of course likewise once more be dependent on the current operating situation. However, it is preferred if, as opposed to the known characteristic maps, the rattling threshold value is used as an unambiguous limit for at least two different operating situations, preferably for all different operating situations. This makes it possible for the respective operating situation to be taken into account exclusively by using a comparison of a produced rattling characteristic value with a static rattling threshold value.

If the rattling characteristic value is greater than the corresponding rattling threshold value, the current rattling situation of the gearbox is in an undesired range, so that, by means of a change and in particular an increase in the slip, this rattling characteristic value can be reduced again for the next run through the method. If, as opposed to this, the rattling characteristic value is smaller than the rattling threshold value, the rattling situation in the gearbox is in an acceptable range, so that either the slip remains the same or even a reduction in the slip by means of more intense pressing of the individual clutch disks against each other becomes possible.

As becomes clear from the above explanation of the method steps, it is possible to dispense with a complicated determination of a characteristic map in the development of a vehicle for the regulation of the slip. Instead, an influence can be exerted on the actual and real situation, in order to keep a corresponding rattling behavior of the gearbox within desired limits. This also becomes possible when no corresponding safety margins within the gearbox have to be taken into consideration, so that, as opposed to the characteristic map solutions that are used and known, a reduction in the fuel consumption becomes possible.

It may be advantageous if, in a method according to the invention, for the determination of the active gearbox shaft, a detection of the engaged gear of the gearbox is carried out. This detection can be carried out both on the gearbox and also at other points of the vehicle. For example in automatic gearboxes, the corresponding detection of the selected gear can be carried out directly on the gear shift lever and within the engine or gearbox electronics. The selected, engaged gear can thus form an additional input signal, in order in a method according to the invention to emphasize the explained advantages still better.

It is also advantageous if, in a method according to the invention, the method steps are carried out in real time or substantially in real time. This therefore means that the time offset is reduced to a minimum. The individual method steps relate to the current real situation of the gearbox that is present in real time, so that the control can carry out the control interventions substantially without latency or with a very low latency.

It may also be advantageous if, in a method according to the invention, after the control of the slip the method steps are carried out again for a directly following time interval. In other words, the individual method steps are repeated directly thereafter, preferably in a continuous way for all the time intervals during the operation of the vehicle. Of course, monitoring of the change in the rattling characteristic value over the individual time intervals can be carried out. Continuous monitoring is associated with the advantages according to the invention for the entire operating period of the vehicle.

It is also advantageous if, in a method according to the invention, a rotational speed value is measured on all input shafts and/or on all output shafts, wherein an individual rattling characteristic value is produced on the basis of each rotational speed value, and/or a common rattling characteristic value is produced on the basis of all the rotational speed values. The more input values that are present on different input shafts and/or output shafts, the more exactly a rattling characteristic value can be produced. In particular, a large number of different rattling characteristic values can be produced specifically for the respective rotational speed value. This leads to it being possible to make an intervention by means of a control method according to the invention as early as when only a single rattling characteristic value exceeds the corresponding rattling threshold value. Simplified regulation is achieved if the rotational speed values from all the detection points are combined in a common rattling characteristic value.

Here, a correlation that can be carried out in detail between the rattling threshold value and the rattling characteristic value is involved. Of course, this can also be applied during the embodiment according to the preceding paragraph, if therefore a plurality of rattling characteristic values are to be or must be correlated with a corresponding plurality of rattling threshold values.

It is likewise advantageous if, in a method according to the invention, the comparison of the rattling threshold value produced for the control of the slip is carried out with at least one lower rattling threshold value and at least one upper rattling threshold value. Therefore, so to speak, a difference between the upper rattling threshold value and the lower rattling threshold value is incorporated as a control brake. As soon as the rattling characteristic value exceeds the upper rattling threshold value, a corresponding control intervention is made in the control of the slip. If, following this control intervention, the rattling characteristic value falls below this upper rattling threshold value again, then between the limits a stepwise reduction in the slip down to a defined minimum value is carried out, until the rattling characteristic value then also falls below the lower rattling threshold value or exceeds the upper rattling threshold value. Only then is a further control intervention triggered, so that an undesired oscillatory behavior during control, in particular closed-loop and/or open-loop control, is avoidable.

It is also advantageous if, in a method according to the invention, the comparison of the rattling characteristic values produced with the at least one rattling threshold value results in a rattling difference which is used in the control of the slip of the clutch device, in particular in a quantitative way. This should be understood to mean that a quantitative analysis in the form of the quantitative overshooting of the rattling threshold value is carried out. In addition, in this way control of the slope of the change of the rattling characteristic value can be carried out. If, from one time interval to the next, the rattling characteristic value has risen so sharply that a high rattling difference must be determined or is determined, a correspondingly intense control intervention must be made in order to counteract this development of the rattling characteristic value as quickly as possible. The quality of the control intervention or the quality of the control function is improved considerably in this quantitative mode of analysis.

It may also be advantageous if, in a method according to the invention, at least one further input condition is taken into account in the control of the slip. For instance, control can preferably be carried out only when an additional input condition is satisfied. As opposed to this, the blocking of the control influence by an additional input condition is also conceivable. For example, there may be specific driving situations in which, even despite the risk of a rattling noise and/or despite the risk of an increased fuel consumption, a defined slip situation on the clutch device is needed and/or desired. Thus, for example in appropriate safety situations, crash situations, acceleration situations or else depending on special driving modes, appropriate suppression or active production of a method according to the invention can be produced by an additional input condition.

A control device for the implementation of a method according to the invention is likewise a subject of the present invention. A control device according to an embodiment of the invention has at least one sensor unit for measuring at least one rotational speed value on an input shaft of the gearbox and for determining the active gearbox shaft. Also provided is a determination unit for determining the angular acceleration on the active gearbox shaft, determined on the basis of the at least one rotational speed value, and for producing a rattling characteristic value on the basis of the angular acceleration determined over at least one time interval. Furthermore, a control unit is provided to control the slip of the clutch device on the basis of a comparison of the rattling characteristic values produced with at least one rattling threshold value. Control devices according to the invention are associated with the same advantages as have been explained extensively with reference to a method according to the invention.

FIG. 1 shows, schematically, how in a gearbox 100 a clutch device 110 makes it possible to couple an input shaft 120 and an output shaft 140. In order to be able to ensure different transmission ratios, in this case three gearbox shafts 130 are arranged in the gearbox 100, so that three different transmission ratios can be selected through three different gears.

Figure 2:
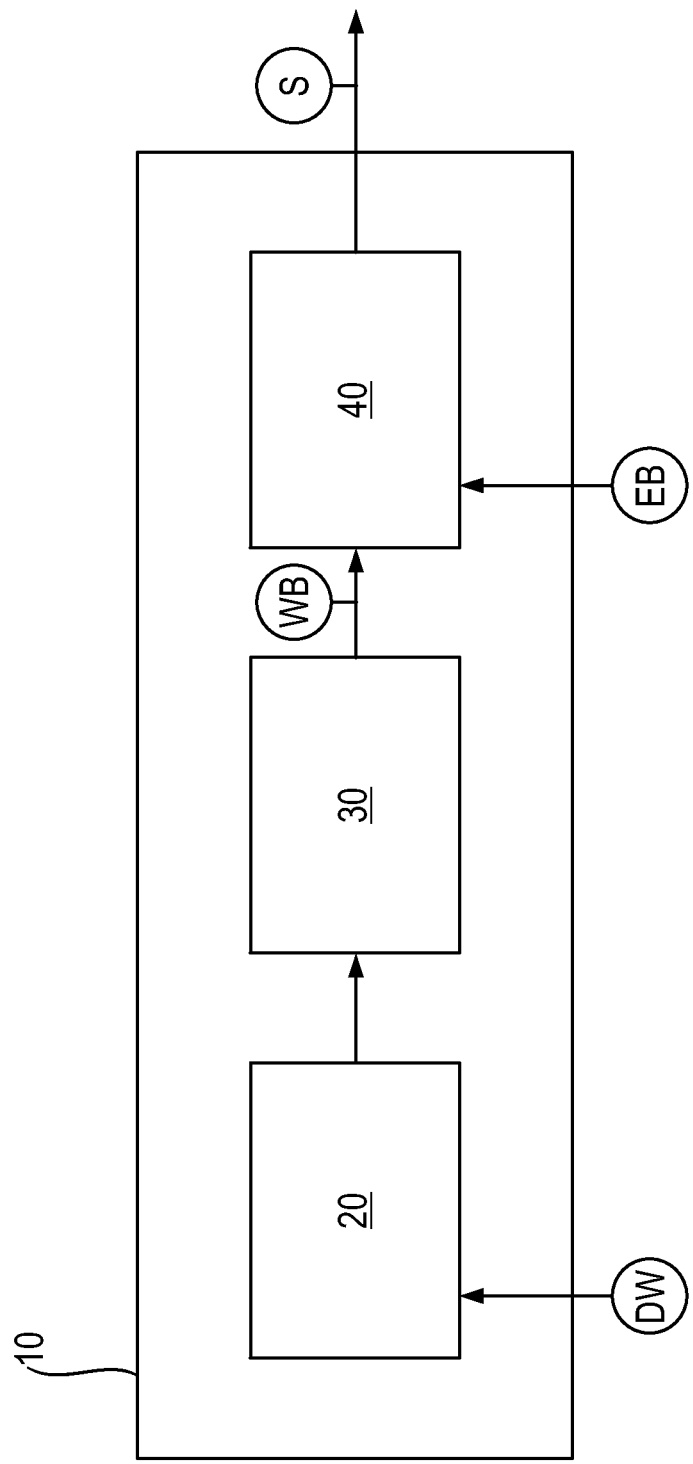
FIG. 2 shows a schematic illustration of a control device according to an embodiment of the invention.

The gearbox 100 according to FIG. 1 is equipped with a control device 10, as shown schematically in FIG. 2. With the aid of a sensor unit 20, it is possible to determine a rotational speed value DW on the gearbox shaft 130. Depending on this rotational speed value and, in addition to the information about an active gearbox shaft 130, a determination unit 30 can then determine an angular acceleration WB on the gearbox shaft 130 determined, on the basis of this measured rotational speed value DW. This angular acceleration WB is passed onto a control unit 40, which then determines a rattling characteristic value RK on the basis of this angular acceleration WB over at least one time interval ZI, and then, with the aid of a comparison of this produced rattling characteristic value RK with at least one rattling threshold value RS, carries out the control of the slip S.

Figure 5:
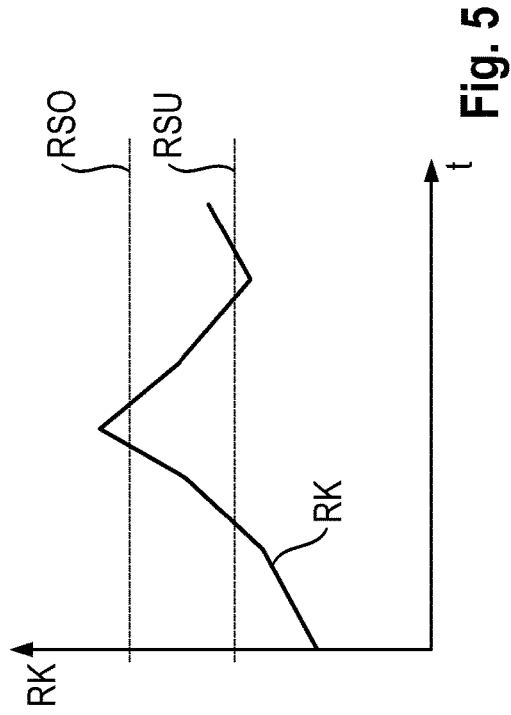
FIG. 5 shows a further possible course of a rattling characteristic value.
Figure 3:
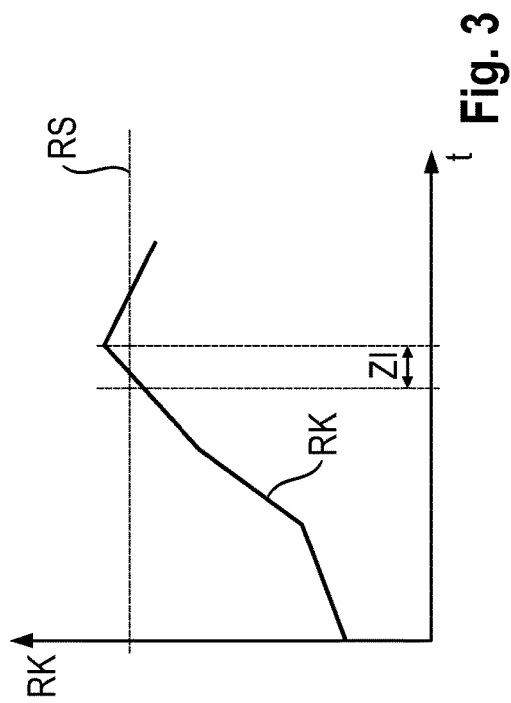
FIG. 3 shows a possible course of a rattling characteristic value.
Figure 4:
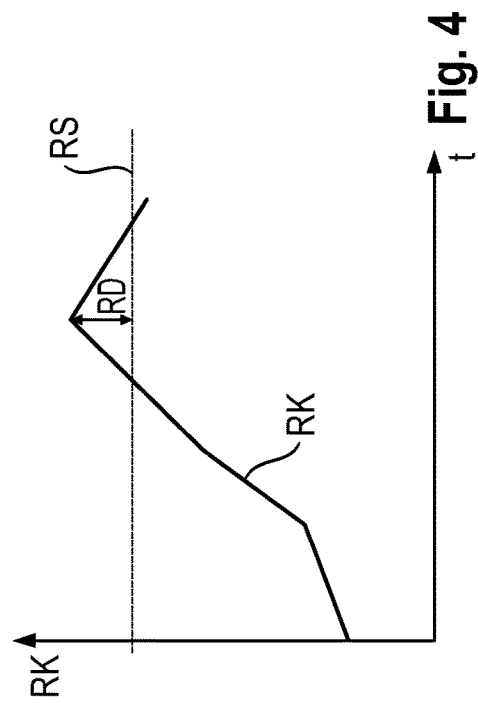
FIG. 4 shows a further possible course of a rattling characteristic value.

FIGS. 3, 4 and 5 show different correlations of the rattling characteristic value RK over the time t. A time interval ZI is illustrated by way of example in FIG. 3. Here, it can be seen that in the time interval ZI, the rattling characteristic value RK exceeds a rattling threshold value RS, and accordingly in this time period a control intervention is made by the control device 10. Following this, the rattling characteristic value RK accordingly again falls below the rattling threshold value RS.

FIG. 4 shows that the intervention according to FIG. 3 can also be made in a quantitative analysis mode, specifically when the rattling difference RD is additionally also taken into account. In a way similar to the sequence of FIG. 3, not only is the absolute monitoring of the exceeding of the rattling threshold value RS carried out. Instead, the rattling difference RD is taken into account. In other words, when the rattling threshold value RS is exceeded, a quantitative analysis of the difference between the rattling characteristic value RK and the rattling threshold value RS is carried out in the form of the rattling difference RD. As soon as the distance between the rattling characteristic value RK and the rattling threshold value RS has exceeded a limit for the rattling difference RD, the control intervention is made, with the same result as has already been explained in relation to FIG. 3.

FIG. 5 illustrates that, to avoid an undesired oscillatory behavior of the entire control topic, the rattling threshold value RS can have a rattling corridor with an upper rattling threshold value RSO and a lower rattling threshold value RSU. FIG. 5 therefore shows a more complex control behavior. In this way, undesired fluctuations in the control can be avoided or at least reduced. The first part of the control corresponds to the explanation relating to FIG. 3. As soon as the rattling characteristic value RK has exceeded the upper rattling threshold value RSO, a control intervention is made in order to bring the rattling characteristic value RK below the upper rattling threshold value RSO again. As soon as the rattling characteristic value RK is between the limits or has reached the lower rattling threshold value RSU, a reduction in the slip S is made or even the establishment of an overpressure, so the rattling characteristic value RK rises again. This variant can also be designated as corridor control or corridor regulation. It is thus ensured that the slip S moves for the most part within the corridor. An unnecessarily high slip S is therefore avoided in exactly the same way as an undesired high rattling characteristic value RK.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for controlling a slip of a clutch device of a gearbox of a vehicle, the method comprising:
   measuring at least one rotational speed value on a gearbox shaft of the gearbox;
   determining an active gearbox shaft;
   determining the angular acceleration on the active gearbox shaft on the basis of the at least one measured rotational speed value;
   producing a rattling characteristic value on the basis of the angular acceleration determined over at least one time interval; and
   controlling the slip of the clutch device on the basis of a comparison of the rattling characteristic value produced with at least one rattling threshold value.

2. The method as claimed in claim 1, wherein, for the determination of the active gearbox shaft, a detection of the engaged gear of the gearbox is carried out.

3. The method as claimed in claim 1, wherein, the method steps are carried out in real time.

4. The method as claimed in claim 1, wherein, after the control of the slip, the method steps are carried out again for a directly following time interval.

5. The method as claimed in claim 1, wherein, a rotational speed value is measured on all gearbox shafts and/or all output shafts, wherein an individual rattling characteristic value is produced on the basis of each rotational speed value and/or a common rattling characteristic value is produced on the basis of all the rotational speed values.

6. The method as claimed in claim 1, wherein, during the comparison of the rattling characteristic value produced with the at least one rattling threshold value, the slip of the clutch device is raised if the rattling characteristic value lies above the at least one rattling threshold value, and/or the slip of the clutch device is reduced, an overpressure being established, if the rattling characteristic value lies below the at least one rattling threshold value.

7. The method as claimed in claim 1, wherein the comparison of the rattling threshold value produced for the control of the slip is carried out with at least one lower rattling threshold value and at least one upper rattling threshold value.

8. The method as claimed in claim 1, wherein the comparison of the rattling characteristic value produced with the at least one rattling threshold value results in a rattling difference, which is used in the control of the slip of the clutch device in a quantitative way.

9. The method as claimed in claim 1, wherein at least one further input condition is taken into account in the control of the slip.

10. A control device for the implementation of a method for controlling the slip of a gearbox of a vehicle, the control device comprising:
   at least one sensor unit for configured to measure at least one rotational speed value on a gearbox shaft of the gearbox and for determining an active gearbox shaft, further having a determination unit for determining the angular acceleration on the active gearbox shaft on the basis of the at least one measured rotational speed value, and for producing a rattling characteristic value on the basis of the angular acceleration determined over at least one time interval; and
   a control unit configured to control the slip of the clutch device on the basis of a comparison of the rattling characteristic value produced with at least one rattling threshold value.

* * * * *